United States Patent [19]

Mashita et al.

[11] Patent Number: 5,321,078
[45] Date of Patent: Jun. 14, 1994

[54] THERMOPLASTIC RESIN COMPOSITION AND MOLDED ARTICLES OBTAINED THEREFROM

[75] Inventors: Kiyotaka Mashita, Chiba; Tatsuo Ishikawa, Ichihara; Susumu Era, Ichihara; Isamu Hattori, Ichihara, all of Japan

[73] Assignee: Hitachi Chemical Co., Ltd., Tokyo, Japan

[21] Appl. No.: 951,119

[22] Filed: Sep. 25, 1992

[30] Foreign Application Priority Data

| Sep. 25, 1991 | [JP] | Japan | 3-245730 |
| Sep. 25, 1991 | [JP] | Japan | 3-245731 |
| Dec. 25, 1991 | [JP] | Japan | 3-343328 |
| Dec. 25, 1991 | [JP] | Japan | 3-343329 |

[51] Int. Cl.$^5$ ............... C08L 51/04; C08L 67/02; C08F 279/02; C08F 265/06
[52] U.S. Cl. ................................. 525/64; 525/69; 525/70; 525/80; 525/83; 525/85; 525/205; 525/222; 525/238; 525/241; 525/281; 525/282; 525/310; 525/316; 524/304; 524/513; 524/539
[58] Field of Search ............... 525/64, 63, 69, 67

[56] References Cited

U.S. PATENT DOCUMENTS

| 4,393,172 | 7/1983 | Lindner et al. | 525/80 |
| 4,417,026 | 11/1983 | Lindner et al. | 525/64 |
| 4,446,276 | 5/1984 | Binsack et al. | 525/64 |
| 4,617,329 | 10/1986 | Weese et al. | 525/64 |
| 5,096,966 | 3/1992 | Piejko et al. | 525/67 |
| 5,180,786 | 1/1993 | Era et al. | 525/64 |

FOREIGN PATENT DOCUMENTS

| 0050262 | 4/1982 | European Pat. Off. |
| 0064207 | 11/1982 | European Pat. Off. |
| 0401628 | 12/1990 | European Pat. Off. |

*Primary Examiner*—James J. Seidleck
*Assistant Examiner*—M. L. Warzel
*Attorney, Agent, or Firm*—Antonelli, Terry, Stout & Kraus

[57] ABSTRACT

A thermoplastic resin composition comprising (A) 45 to 99% by weight of a graft copolymer obtained by special graft polymerization of a monomer (b) such as an aromatic vinyl compound, a methacrylic ester, etc. in the presence of grafted polymer rubber (a), and (B) 55 to 1% by weight of a thermoplastic aromatic polyester resin can yield shaped articles excellent in impact resistance, chemical resistance, etc. with excellent processability.

5 Claims, No Drawings

[5,321,078]

THERMOPLASTIC RESIN COMPOSITION AND MOLDED ARTICLES OBTAINED THEREFROM

BACKGROUND OF THE INVENTION

This invention relates to a thermoplastic resin composition and a molded article obtained therefrom and excellent in impact resistance, chemical resistance and resistance to thermal deformation.

Acrylonitrile-acrylic rubber-styrene terpolymers (AAS resins) are widely used due to having excellent properties in weather resistance, impact resistance, processability, etc., but insufficient in chemical resistance and heat resistance. On the other hand, thermoplastic aromatic polyester resins (hereinafter referred to as "polyester") are known as resins having excellent chemical resistance and heat resistance But these polyesters are poor in impact resistance, so that there has been proposed blend of the polyesters with ABS resins (acrylonitrile-polybutadiene rubber-styrene terpolymer resins), AAS resins, etc. (Japanese Patent Examined Publication No. 51-25261, Japanese Patent Unexamined Publication Nos. 54-150457, 57-94038, etc.). According to these proposals, since compatibility of ABS resins and AAS resins with polyesters is poor, there are obtained no composition having sufficiently satisfactorily balanced properties.

On the other hand, in order to improve weather resistance of ABS resins and surface quality of injection molded articles, Japanese Patent Examined Publication No. 47-47863 and U.S. Patent No. 4,393,172 disclose grafted polymers comprising a core formed by a crosslinked diene rubber, a first outer shell covering the core and formed by a crosslinked acrylic rubber, and a second outer shell formed thereon with a copolymer obtained by polymerizing glassy resin-forming monomer or monomers. These grafted polymers show good impact resistance but require further improvement. But these prior art references are quite silent on blending of these graft polymers with polyesters. Further, these prior art references are also quite silent on how to improve the impact resistance by other methods.

Japanese Patent Examined Publication No. 63-54729 (Japanese Patent Unexamined publication No. 58-187411) discloses the same grafted polymer as mentioned above, but obtained by stopping the polymerization in the course of formation of acrylic rubber. But this reference is quite silent on blending of such a grafted polymer with a polyester.

Further, U.S. Pat. No. 4,417,026 discloses a thermoplastic polyester composition for molding comprising 1 to 40% by weight of the grafted polymer disclosed U.S. Pat. No. 4,393,172 mentioned above, and 99 to 60% by weight of a saturated polyester. According to this reference, the impact strength of the saturated polyester can be improved by blending with the grafted polymer. But the present inventors found that such a blending was insufficient to obtain desirable impact resistance. Particularly, it was found that even if the grafted polymer may have excellent impact resistance, the blending of such a grafted polymer with polyesters remarkably lowered the impact resistance.

SUMMARY OF THE INVENTION

It is an object of the present invention to provide a thermoplastic resin composition useful for giving molded articles having excellent impact resistance, chemical resistance, heat resistance, etc., while maintaining good impact resistance and processability of grafted copolymers containing a diene rubber, acrylic rubber and a resin forming component, and also maintaining good chemical resistance and heat resistance of polyesters.

The present invention provides a thermoplastic resin composition comprising (A) 45 to 99% by weight of a graft copolymer and (B) 55 to 1% by weight of a thermoplastic aromatic polyester resin, said graft copolymer (A) being obtained by polymerizing a polymerizable monomer (b) in an amount of 95 to 50 parts by weight in the presence of a grafted polymer rubber (a) in an amount of 5 to 50 parts by weight, a total of (a) and (b) being 100 parts by weight, said grafted polymer rubber (a) having been obtained by emulsion polymerization of 95 to 60 parts by weight of a polymerizable monomer mixture ($\alpha$) comprising (I) 0.1 to 20% by weight of a polyfunctional monomer, (II) 50 to 99.9% by weight of an acrylic ester with an alkyl group having 1 to 13 carbon atoms, and (III) 0 to 30% by weight of a vinyl compound other than (I) and (II), a total of (I) to (III) being 100% by weight, in the presence of 5 to 40 parts by weight of a conjugated diene polymer ($\beta$), a total of ($\alpha$) and ($\beta$) being 100 parts by weight, said polymerizable monomer (b) comprising (IV) 0 to 100% by weight of an aromatic vinyl compound, (V) 0 to 100% by weight of a methacrylic acid ester, and (VI) 0 to 40% by weight of a vinyl cyanide compound, a total of (IV) to (VI) being 100% by weight, said graft copolymer (A) being obtained by (i) polymerizing 5 to 30% by weight of said polymerizable monomer (b) in the presence of said grafted polymer rubber (a), followed by polymerization of the rest of polymerizable monomer (b), and/or (ii) emulsion polymerizing said polymerizable monomer mixture ($\alpha$) in the presence of said conjugated diene polymer ($\beta$) until conversion of 50% to 93% by weight, followed by polymerization of said polymerizable monomer (b) in the presence of the resulting grafted polymer rubber (a).

The present invention also provides a shaped article obtained by molding said thermoplastic resin composition.

DESCRIPTION OF THE PREFERRED EMBODIMENTS

The grafted polymer rubber (a) used for producing the graft copolymer (A) is obtained by emulsion polymerization of 95 to 60 parts by weight of a polymerizable monomer mixture ($\alpha$) comprising (I) 0.1 to 20% by weight of a polyfunctional monomer, (II) 50 to 99.9% by weight of an acrylic ester with an alkyl group having 1 to 13 carbon atoms, and (III) 0 to 30% by weight of a vinyl compound other than (I) and (II) and copolymerizable with the components (I) and (II), in the presence of 5 to 40 parts by weight of a conjugated diene polymer ($\beta$), a total of ($\alpha$) and ($\beta$) being 100 parts by weight.

As the polyfunctional monomer (I), there can be used polyvalent vinyl compounds such as ethylene glycol dimethacrylate, diethylene glycol dimethacrylate, ethylene glycol diacrylate, divinylbenzene, dicyclopentadiene acrylate, dicyclopentadiene methacrylate, etc.; polyvalent allyl compounds such as triallyl isocyanurate, triallyl cyanurate, diallyl phthalate, etc. These polyfunctional monomers can be used alone or as a mixture thereof. Among these compounds, the use of triallyl isocyanurate, triallyl cyanurate, dicyclopentadiene acrylate or dicyclopentadiene methacrylate is particularly preferable from the viewpoint of impact resistance.

The polyfunctional monomer (I) is used in an amount of 0.1 to 20% by weight, more preferably 0.5 to 10% by weight, in the polymerizable monomer mixture ($\alpha$). When the amount is less than 0.1% by weight, the degree of crosslinking becomes insufficient, so that impact resistance and surface appearance of molded articles become lower. On the other hand, when the amount is more than 20% by weight, the degree of crosslinking becomes superfluous, so that impact strength become lower As the acrylic ester (II) with an alkyl group having 1 to 13 carbon atoms, there can be used ethyl acrylate, butyl acrylate, 2-ethylhexyl acrylate, etc. Among them, the use of butyl acrylate is particularly preferable.

The acrylic ester (II) is used in an amount of 50 to 99.9% by weight, more preferably 65 to 99.5% by weight, in the polymerizable monomer mixture ($\alpha$). When the amount is less than 50% by weight, properties of acrylic rubber are lowered to show a tendency of making impact resistance of the graft copolymer (A) insufficient.

As the vinyl compound (III) copolymerizable with the compounds (I) and (II), there can be used acrylonitrile, styrene, etc. The vinyl compound (III) is used preferably in an amount of 0 to 30% by weight, more preferably 0 to 25% by weight, in the polymerizable monomer mixture ($\alpha$). When the amount is more than 30% by weight, properties of acrylic rubber are lowered to show a tendency of making impact resistance of the graft copolymer (A) insufficient.

As the conjugated diene polymer ($\beta$), there can be used polybutadiene, butadiene-styrene copolymer, etc. The use of crosslinked conjugated diene polymer is preferable. Particularly, there can be used the conjugated diene polymer ($\beta$) having a gel content of preferably 50% by weight or more, more preferably 60% by weight or more, most preferably 70% by weight or more.

The polymerizable monomer mixture ($\alpha$) and the conjugated diene polymer ($\beta$) are used in a weight ratio of ($\beta$)/($\alpha$) of 5/95 to 40/60. when the weight ratio is less than 5/95, impact resistance and surface appearance of molded articles are lessened. On the other hand, when the weight ratio is more than 40/60, weather resistance is undesirably lowered. The term "gel content" means a proportion of non-dissolved portion after dissolving the polymer using an organic solvent such as toluene, etc.

The use of the conjugated diene polymer ($\beta$) in the form of a latex obtained by previously dispersing the conjugated diene polymer in an aqueous medium is preferable considering easy dispersion at the time of emulsion polymerization.

The emulsion polymerization for yielding the grafted polymer rubber (a) can be carried out by a conventional process. The emulsion polymerization can be carried out until the conversion of the polymerizable monomer mixture ($\alpha$) becomes 93 to 100% by weight. In order to improve compatibility with a polyester and to obtain high impact resistance, it is preferable to stop the polymerization at a conversion of 50% to 93% by weight, more preferably 60 to 90% by weight.

When the conversion of the polymerizable monomer mixture ($\alpha$) in the emulsion polymerization is less than 50% by weight, the ratio of copolymerization with the polymerizable monomer (b) at the time of copolymerization with the monomer (b) becomes high, resulting in lowering thermal deformation temperature of the graft copolymer (A).

At the time of emulsion polymerization, there can be used a small amount of emulsifier. As the emulsifier, there can be used anionic emulsifiers such as sodium oleate, sodium lauryl sulfate, sodium dodecylbenzene sulfonate, etc.; nonionic emulsifiers such as polyoxyethylene cetyl ether, etc.

As the polymerization initiator, there can be used redox initiators conventionally used in the emulsion polymerization such as persulfates, cumene hydroperoxidesodium formaldehyde sulfoxylate, etc.

The graft copolymer (A) is obtained by polymerizing a polymerizable monomer (b) comprising (IV) 0 to 100% by weight of an aromatic vinyl compound, (V) 0 to 100% by weight of a methacrylic acid ester, and (VI) 0 to 40% by weight of a vinyl cyanide compound, a total of (IV) to (VI) being 100% by weight, in the presence of the grafted polymer rubber (a) thus obtained. The vinyl cyanide compound (VI) should be used in an amount of 40% by weight or less in order to prevent lowering in processability. Further, when the aromatic vinyl compound (IV) is used in an amount of 30% by weight or more, the processability is improved. When the vinyl cyanide compound (VI) is used in an amount of 10% by weight, chemical resistance is improved. Therefore, the use of polymerizable monomer (b) comprising (IV) in an amount of 30 to 100% by weight, particularly 50 to 90% by weight, (V) in an amount of 0 to 70% by weight, particularly 0 to 40% by weight, and (VI) in an amount of 0 to 30% by weight, particularly 10 to 30% by weight, is preferable.

As the aromatic vinyl compound (IV), there can be used $\alpha$-substituted styrenes such as $\alpha$-methylstyrene, $\alpha$-ethylstyrene, etc.; nuclear-substituted styrene such as chlorostyrene, vinyltoluene, t-butylstyrene, etc.; and styrene.

As the methacrylic acid ester (V), there can be used methyl methacrylate, ethyl methacrylate, butyl methacrylate, etc.

As the vinyl cyanide compound (VI), there can be used acrylonitrile, methacrylonitrile, etc.

The grafted polymer rubber (a) and the polymerizable monomer (b) are used in amounts of 5 to 50 parts by weight of (a) and 95 to 50 parts by weight of (b), a total of (a) and (b) being 100 parts by weight. When the weight ratio of (a)/(b) is less than 5/95, impact resistance is lowered, while when the weight ratio is more than 50/50, mechanical strength and resistance to thermal deformation are lowered.

The polymerization of the polymerizable monomer (b) in the presence of the grafted polymer rubber (a) can be carried out by emulsion polymerization, suspension polymerization, solution polymerization, etc. At the time of polymerization, there can be used an emulsifier, a polymerization initiator, a chain transfer agent, and the like. For example, when a redox initiator such as a persulfate, cumene hydroperoxide-sodium formaldehyde sulfoxylate is used as the polymerization initiator, it is used in an amount of about 0.1 to 2% by weight based on the weight of the monomer (b). As the chain transfer agent, for example, tert-dodecylmercaptane is used in an amount of about 1% by weight or less based on the weight of the monomer (b). The polymerization is preferably carried out at a temperature of 20° to 100° C., more preferably 50° to 90° C. The same conditions can be applied to the production of the grafted polymer rubber.

Further, the polymerizable monomer (b) can be polymerized in the presence of the grafted polymer rubber (a) at one time (the whole amount of the monomer (b) being polymerized at one time), or polymerized dividedly two or more times, or polymerized while dropping, i.e. gradually adding the whole amount of monomer.

A preferable method is, for example, to polymerize 5 to 30% by weight of the polymerizable monomer (b) in the first step, and to polymerize the rest of the polymerizable monomer (b) in the second step by adding the monomer (b) at one time or two or more times dividedly. By applying such a multi-step polymerization, the melt flow property and the thermal deformation temperature are enhanced and impact resistance is also improved. In the multi-step polymerization, it is preferable to polymerize the polymerizable monomer (b) in an amount of 5 to 30% by weight in the first step. When the amount is less than 5% by weight, there is no difference in the case of polymerizing the whole amount in the first step. On the other hand, when the amount is more than 30% by weight, the effect for improving the impact resistance and the thermal deformation temperature by polymerization by adding the polymerizable monomer (b) dividedly, is lessened. Further, in this case, it is preferable to carry out the polymerization by adding the rest of the polymerizable monomer (b) after the conversion of 50% by weight or more. When the conversion in the first step is less than 50% by weight, there is a tendency to lessen the effect for improving the thermal deformation temperature and impact resistance.

The conversion can be calculated as follows:

$$\left[1 - \frac{\left(\begin{array}{c}\text{total weight of unreacted monomer at}\\ \text{the end of first step polymerization}\end{array}\right)}{\left(\begin{array}{c}\text{weight of un-}\\ \text{reacted monomer}\\ \text{of monomer}\\ \text{mixture } (\alpha)\\ \text{contained in}\\ \text{grafted polymer}\\ \text{rubber } (a)\end{array}\right) + \left(\begin{array}{c}\text{weight of}\\ \text{monomer } (b)\\ \text{used in the}\\ \text{first step}\\ \text{polymerization}\end{array}\right)}\right] \times 100(\%)$$

Even if the polymerizable monomer (b) is used dividedly as mentioned above, the using proportions of the components (IV), (V) and (VI) as a whole are controlled as mentioned above. The using proportions may be different in the first and second or later steps, but it is preferable to use the same proportions in each step.

The graft copolymer (A) obtained by emulsion-polymerizing the polymerizable monomer (b) in the presence of the grafted polymer rubber (a) can be separated by coagulations, followed by removing water by means of centrifugation and drying. The coagulation, for example, can be carried out by mixing the latex after polymerization with hot water dissolving potassium alum. Then, the graft copolymer (A) in the form of a powder or pellets obtained by using an extruder is blended with a polyester.

The production of graft copolymer (A) is characterized by (i) polymerizing 5 to 30% by weight o the polymerizable monomer (b) in the presence of the grafted polymer rubber first (this polymerization is preferably carried out until the above-defined conversion becomes 50% by weight or more), followed by polymerization of the rest of the polymerizable monomer (b), (ii) emulsion polymerizing the polymerizable monomer mixture ($\alpha$) in the presence of the conjugated diene polymer ($\beta$) until the conversion becomes 50% t 93% by weight, followed by polymerization of the polymerizable monomer (b) in the presence of the grafted polymer rubber (a), or (iii) conducting the above-mentioned steps (i) and (ii).

Therefore, in the production of the grafted polymer rubber (a), even if the emulsion polymerization of the polymerizable monomer mixture ($\alpha$) is carried ou in the presence of the conjugated diene polymer ($\beta$) until the conversion becomes more than 93% by weight, the desired graft copolymer (A) can be obtained by conducting the step (i) mentioned above. Further, even if the polymerization of the polymerizable monomer (b) in the presence of the grafted polymer rubber (a) is not carried out dividedly as mentioned above, the desired graft copolymer (A) can be obtained by conducting the step (ii) mentioned above. But to carry out both steps (i) and (ii) is most preferable. When the graft copolymer (A produced by the process comprising the above-mentioned steps is used, the thermoplastic resin composition of the present invention is excellent in impact resistance, resistance to thermal deformation and chemical resistance and well-balanced in these properties. And lowering of the impact resistance is very small, even if the graft copolymer (A) is blended with a polyester (B).

As the thermoplastic aromatic polyester resin used as the component (B), there can be used polyalkylene terephthalates obtained by polycondensing a terephthalic acid or a derivative thereof with an aliphatic glycol or copolymers containing them as a major component. Typical examples of the polyalkylene terephthalate are polyethylene terephthalate, polybutylene terephthalate, etc.

As the acid component used in the production of the polyester resin, there can be used phthalic acid, isophthalic acid, naphthalene dicarboxylic acid, diphenyl ether 4,4'-dicarboxylic acid, adipic acid, sebasic acid, cyclohexane dicarboxylic acid, etc. together with terephthalic acid.

As the aliphatic glycol, there can be used ethylene glycol, propylene glycol, butylene glycol, diethylene glycol, triethylene glycol, etc. It is possible to use other diols or polyhydric alcohols such as cyclohexane dimethanol, 2,2-bis(4-hydroxyphenyl)propane, 2,2-bis(4-hydroxyethoxyphenyl)propane, glycerine, pentaerythritol, etc., together with the aliphatic glycol.

From the viewpoint of impact resistance, it is preferable to use a polyester resin having an intrinsic viscosity of 0.5 or more when measured at 25° C. in ochlorophenol singly or in a mixture of phenol and tetrachloroethane (50/50, weight ratio).

The thermoplastic resin composition comprises the component (A) and the component (B) in a weight ratio of (A)/(B) in the range of 99/1 to 45/55. When the weight ratio is more than 99/1, improving effects of the polyester in chemical resistance and resistance to thermal deformation are lowered. On the other hand, when the weight ratio is less than 45/55, the impact resistance is lowered. Particularly, the blending ratio of (A)/(B) is preferable in the range of 95/5 to 50/50 (weight ratio), and more preferable in the range of 95/5 to 55/45.

The thermoplastic resin composition of the present invention may further contain as a component (C) a polymer obtained by polymerizing at least one monomer selected from the group consisting of aromatic vinyl compounds, vinyl cyanide compounds, methacrylic acid esters and N-substituted maleimide compounds.

As the aromatic vinyl compounds, there can be used α-substituted styrenes such as α-methylstyrene, α-ethylstyrene, etc.; nuclear-substituted styrenes such as chlorostyrene, vinyltoluene, t-butylstyrene, etc; and styrene.

As the vinyl cyanide compounds, there can be used acrylonitrile, methacrylonitrile, etc.

As the methacrylic acid esters, there can be used methyl methacrylate, ethyl methacrylate, butyl methacrylate, etc.

As the N-substituted maleimide compounds, there can be used N-phenylmaleimide, N-cyclohexylmaleimide, N-hydroxyphenylmaleimide, N-methylphenylmaleimide, N-dimethylphenylmaleimide, N-chlorophenylmaleimide, N-methylmaleimide, N-ethylmaleimide, etc. Among them, N-phenylmaleimide is preferable.

Preferable examples of polymers used as the component (C) are acrylonitrile-styrene copolymers, acrylonitrile-α-methylstyrene copolymers, acryloacrylon nitrile-α-methylstyrene-N-phenylmaleidmide copolymers, acrylonitrile-styrene-α-methylstyrene copolymes, styrene-N-phenylmaleimide copolymers, methyl methacrylate-styrene copolymers, poly(methyl methacrylate), etc.

These copolymers can be obtained by emulsion polymerization, suspension polymerization, solution polymerization, bulk polymerization, etc.

The component (C) is used as a part of the component (A) in the thermoplastic resin composition. Thus, the components (A), (B) and (C) can be blended so as to make the weight ratio of [(A)+(C)]/(B)] 99/1 to 45/55. When the proportion is more than 99/1, improving effects in chemical resistance and resistance to thermal deformation by the polyester is lowered, while when the proportion is less than 45/55, impact resistance is lowered. The blending weight ratio of [(A)+(C)]/(B) is preferable when 95/5 to 50/50 and more preferable when 95/5 to 55/45. The weight ratio of (C)/(A) is preferable when 0/100 to 70/30, more preferable when 0/100 to 40/60.

In order to further improve the impact resistance, the thermoplastic resin composition of the present invention may further contain a plasticizer as the component (D).

Examples of the plasticizer are aliphatic dibasic acid esters such as diisodecyl succinate, dioctyl adipate, diisodecyl adipate, dioctyl azelate, dibutyl sebacate, dioctyl sebacate, dioctyl tetrahydrophthalate, etc.; phthalic acid esters such as dimethyl phthalate, diethyl phthalate, diisobutyl phthalate, dibutyl phthalate, diheptyl phthalate, di-2-ethylhexyl phthalate, diisooctyl phthalate, di-n-octyl phthalate, dinonyl phthalate, diisodecyl phthalate, ditridecyl phthalate, dicyclohexyl phthalate, butylbenzyl phthalate, butyllauryl phthalate, methyloleyl phthalate, etc. glycol esters such as diethylene glycol dibenzoate, dipentaerythritol hexaester, pentaerythritol ester, etc.; fatty acid esters such as butyl oleate, methyl acetylricinoleate, etc.; phosphoric acid esters such as tricresyl phosphate, trioctyl phosphate, octyldiphenyl phosphate, triphenyl phosphate, etc.; epoxy compounds such as epoxidized soybean oil, butyl epoxystearate, octyl epoxystearate, benzyl epoxystearate, etc.; trioctyl trimelliate, triisodecyl trimellitate, tetraoctyl pyromellitate, ethylphthalyl ethyglycolate, butylphthalyl butylglycolate, etc.

The component (D) is preferably used in an amount of making the weight ratio of (D /[(A)+(B)+(C)] preferably 1/100 to 20/100, more preferably 2/100 to 15/100. When the content of the component (D) is too small, there is a tendency to lower the effect for improving impact resistance. On the other hand, when the content of the component (D) is more than 20/100, there is a tendency to lower resistance to thermal deformation.

The thermoplastic resin composition of the present invention may further contain one or more conventional additives such as reinforcing agents or fillers, e.g. glass fibers, metallic fibers, carbon fibers, etc.; dyes, pigments, heat stabilizers, light stabilizers, and other additives usually added to AAS resins, etc.

The thermoplastic resin composition of the present invention can be mixed uniformly by using a twin roll, a Banbury mixer, an extruder, or other mixing machines.

Various molded articles can be obtained from the thermoplastic resin composition of the present invention by a casting method, an extrusion molding method, an injection molding method, a blow molding method, a vacuum molding method, etc.

The present invention is illustrated by way of the following Examples, in which all parts and percents are by weight, unless otherwise specified.

In the following Examples, properties of molding materials and molded articles were measured as follows.

Izod impact strength

Measured according to ASTM-D 256 using a 1/8 inch notched specimen.

Resistance to thermal deformation

A JIS #1 dumbbell specimen of 2 mm thick specified by JIS K 7113 was allowed to stand in a thermostat at 150° C. for 30 minutes and subjected to measurement of deformation, and shown in terms of its changing rate.

MFR (Melt flow rate)

Measured according to JIS-K 7210 at 230° C. under a load of 10 kg.

Chemical resistance

A plate obtained by injection molding using a thermoplastic resin composition was immersed in methanol or gasoline at 23° C. for 24 hours, followed by observation of the plate surface by the naked eye.

Gel content of polybutadiene

A precipitate was formed from a polybutadiene latex using methanol and collected. About 1 g of the collected precipitate was immersed in 100 ml of toluene and allowed to stand at room temperature for 48 hours. After filtering, a filtrate and a residue therefrom, i.e. swollen gel were separated. A filtrate in an amount of 20 ml was taken out and dried to give a dried sol. The weight of the dried sol (Z) was measured. After removing the toluene from the swollen gel, the swollen gel was allowed to stand in a desiccator filled with toluene vapor for 5 hours to saturate the toluene then, the weight of swollen gel (G) was measured. The gel content of polybutadiene was calculated using the following equation:

$$[S-(T+S-G)\times Z \div F] \div S \times 100 \, (\%)$$

wherein S is the weight of collected precipitate; T is the weight of 100 ml of toluene; and F is the weight of 20 ml of the filtrate.

REFERENCE EXAMPLE 1

Production of Graft Copolymer G-1

(a) Production of Grafted Polymer Rubber Latex

Formulation

| Component ① | |
|---|---|
| Polybutadiene latex (SN-800T, a trade name, mfd. by Sumitomo Naugatuck Co., Ltd., crosslinked polybutadiene having a gel content of 82%) | 300 parts (solid content) |
| Component ② | |
| Butyl acrylate | 700 parts |
| Triallyl isocyanurate | 14 parts |
| Component ③ | |
| Potassium persulfate | 0.4 part |
| Sodium sulfite | 0.04 part |
| Emulsifier (Nonsoul TN-1, a trade name, mfd. by Nippon Oil & Fats Co., Ltd., fatty acid soap) | 9.2 parts |
| Deionized water | 1420 parts |

Polymerization Procedure

In a reactor, the component ① and the component ③ uniformly dissolved were charged, and mixed with stirring. Then, the component ② uniformly dissolved was added thereto, followed by bubbling with nitrogen to remove dissolved oxygen. The temperature was raised to 60° to 65° C. to carry out the polymerization for about 4 hours. After cooling, the polymerization was stopped. The conversion was 67%. The conversion was measured as follows.

Measurement of Conversion

A small amount of reaction mixture was taken out of the polymerization system and weighed. After heating with an infrared lamp, the sampled reaction mixture was dried and subjected to measurement of residual non-volatile content. The conversion was calculated using the following equation:

$$\text{Conversion} = [(\alpha \times \beta \div \gamma - \delta)/\epsilon] \times 100\%$$

wherein
- $\alpha$: total weight of reaction mixture
- $\beta$: weight of non-volatile content in sampled reaction mixture,
- $\gamma$: weight of sampled reaction mixture,
- $\delta$: weight of solid content in the used polybutadiene latex, and
- $\epsilon$: total weight of used butyl acrylate and triallyl isocyanurate.

The resulting conversion is named as "Conversion A".

(b) Emulsion Polymerization in the Presence of Grafted Polymer Rubber Latex

Formulation

| Component ④ | |
|---|---|
| Deionized water | 1425 parts |
| Emulsifier (Nonsoul TN-1) | 10.6 parts |
| Rongalite | 2.8 parts |
| Component ⑤ | |
| Styrene | 507 parts |
| Acrylonitrile | 193 parts |
| Cumene hydroperoxide | 2.45 parts |
| tert-Dodecylmercaptan | 2.8 parts |

Polymerization Procedure

In a reactor, the components ④ and ⑤ were charged and mixed uniformly with stirring. To the resulting mixture, 300 parts of the grafted polymer rubber latex obtained in above (a) (a solids constituent containing residual monomers; the grafted polymer rubber containing residual monomers in an amount of 30% based on the total weight of the grafted polymer rubber, styrene and acrylonitrile) was added, followed by mixing with stirring for further 30 minutes while bubbling with nitrogen to remove dissolved oxygen. After polymerizing 65° C. for about 6 hours, the conversion of 90% was confirmed. After polymerizing at 90° C. for further hours, there was obtained a resin latex. The resin latex was salted out in hot water dissolving potassium alum, followed by dehydration drying to give a resin powder. The resin powder was pelletized using an extruder (hereinafter referred to as "Graft Copolymer G-1").

The conversion was measured as follows.

Measurement of Conversion

A small amount of reaction mixture was sampled from the polymerization system and weighed. The sampled reaction mixture was heated with an infrared lamp, dried and subjected to the measurement of residual nonvolatile content. The conversion was calculated using the following equation.

$$\text{Conversion} = [(\alpha \times \beta \div \gamma - \delta + \epsilon)/(\epsilon + \xi)] \times 100\%$$

wherein
- $\alpha$: total weight of reaction mixture
- $\beta$: weight of non-volatile content in the sampled reaction mixture,
- $\gamma$: weight of sampled reaction mixture,
- $\delta$: weight of solid content in the used grafted polymer rubber latex,
- $\epsilon$: weight of residual unreacted monomers in the used grafted polymer rubber latex, and
- $\xi$: total weight of used styrene and acrylonitrile The resulting conversion is named as "Conversion B".

REFERENCE EXAMPLE 2

Production of Graft Copolymers G-2 and G-3

The process of Reference Example 1 was repeated except for stopping the polymerization at the Conversion A of 55% and 90%, respectively. The resulting resin pellets are named as Graft Copolymer G-2 (Conversion A: 55%) and Graft Copolymer G-3 (Conversion B: 90%).

REFERENCE EXAMPLE 3

Production of Graft Copolymers G-4 and G-5

The process of Reference Example 1 was repeated except for stopping the polymerization at the Conversion A of 45% and 95%, respectively. The resulting resin pellets are named as Graft Copolymer G-4 (Conversion A: 45%) and graft Copolymer G-5 (Conversion A: 95%).

REFERENCE EXAMPLE 4

Production of Graft copolymers G-6 to G-9

Using the formulations as shown in Table 1, the polymerization was carried out to give pellets of thermoplastic resin compositions. The polymerization procedure was as follows.

In a reactor, the component ①, the component ②, the component ③, the component ④ and the component ⑤ were placed in this order, and stirred at room temperature for about 1 hour, while bubbling with nitrogen to remove dissolved oxygen. Then, the temperature was raised to 70° C. and the reaction was carried out until the Conversion B became 65%. Then, the component was added to the reaction mixture. The polymerization was carried out at 74° C. for about 2 hours while dropping the component ⑦ thereinto. After completion of dropwise addition of the component ⑦, the temperature was maintained at 74° C. and the component ⑧ was added to the reaction mixture and maintained at 74° C. for 1 hour. Then, the component ⑨ was added thereto and maintained at the same temperature for 2 hours. The resulting resin latex was salted out in hot water dissolving (or a hot aqueous solution of) potassium alum, subjected to removal of water by means of centrifugations, and dried to give Graft Copolymers G-6 to G-9.

In the production of Graft Copolymers G-6 to G-9, adding proportions of the monomer mixture (b) in the first step were 5%, 15%, 30% and 40%, respectively.

TABLE 1

| | | Graft copolymer (parts) | | | |
|---|---|---|---|---|---|
| | | G-6 | G-7 | G-8 | G-9 |
| Component ① | Grafted polymer rubber latex obtained in Reference Example 1(a) (solid content containing residual monomers) | 300 | 300 | 300 | 300 |
| Component ② | Deionized water | 635 | 685 | 775 | 820 |
| | sodium | | | | |
| | Emulsifier (Emal 2F) | 0.73 | 0.73 | 0.73 | 0.73 |
| | Emulsifier (KS Soap) | 0.83 | 2.16 | 4.19 | 5.52 |
| Component ③ | Styrene | 10 | 37.5 | 100 | 150 |
| | Acrylonitrile | 10.5 | 31.5 | 58 | 77 |
| | Cumene hydroperoxide | 0.123 | 0.368 | 0.735 | 0.98 |
| Component ④ | Styrene | 14.5 | 36 | 52 | 53 |
| | t-Dodecylmercaptan | 0.14 | 0.42 | 0.84 | 1.12 |
| Component ⑤ | Rongalite C | 3.01 | 3.01 | 3.01 | 3.01 |
| | Deionized water | 115 | 115 | 115 | 115 |
| Component ⑥ | Potassium carbonate | 7.84 | 7.84 | 7.84 | 7.84 |

TABLE 1-continued

| | | Graft copolymer (parts) | | | |
|---|---|---|---|---|---|
| | | G-6 | G-7 | G-8 | G-9 |
| | Deionized water | 70 | 70 | 70 | 70 |
| Component ⑦ | Styrene | 483 | 434 | 355.5 | 304.5 |
| | Acrylonitrile | 182 | 161 | 134.5 | 115.5 |
| | t-Dodecylmercaptan | 2.66 | 2.38 | 1.96 | 1.68 |
| | Cumene hydroperoxide | 2.33 | 2.08 | 1.72 | 1.47 |
| | Emulsifier (KS Soap) | 12.4 | 11.1 | 9.11 | 7.81 |
| | Deionized water | 440 | 390 | 320 | 275 |
| Component ⑧ | Emulsifier (KS Soap) | 0.27 | 0.24 | 0.20 | 0.17 |
| | Deionized water | 120 | 120 | 100 | 100 |
| Component ⑨ | Potassium carbonate | 1.37 | 1.37 | 1.37 | 1.37 |
| | Deionized water | 70 | 70 | 70 | 70 |

Note)
Emul 2F and KS Soap are manufactured by Kao Corp.

REFERENCE EXAMPLE 5

Production of Graft Copolymer G-10

The process of Reference Example 1 was repeated except for making the amount of grafted polymer rubber used in Reference Example 1 15% based on the total weight of the grafted polymer rubber (containing residual monomers), styrene and acrylonitrile. The resulting resin pellets are named as Graft Copolymer G-10.

Examples 1 to 10 and Comparative Examples 1 to 5

Poly(butylene terephthalate) (hereinafter referred to as "PBT"; 1401-X06, mfd. by Toray Industries, Inc., having an intrinsic viscosity of 1.6 measured at ° C in o-chlorophenol) and Graft Copolymers G-1 to G-9 were mixed so as to obtain the formulations as shown in Table 2. The resulting mixture was kneaded at 250° C. using a biaxial extruder (bent type) of 30 mm in diameter. Test samples were molded using an injection molding machine at the cylinder temperature of 250° C. and the mold temperature of 50° C. Using the resulting test samples, the properties were evaluated and shown in Table 3.

TABLE 2

| | Graft Copolymer | | PBT |
|---|---|---|---|
| | Kind | Amount (parts) | Amount (parts) |
| Example 1 | G-1 | 70 | 30 |
| Example 2 | G-2 | 70 | 30 |
| Example 3 | G-3 | 70 | 30 |
| Example 4 | G-6 | 70 | 30 |
| Example 5 | G-7 | 70 | 30 |
| Example 6 | G-8 | 70 | 30 |
| Example 7 | G-9 | 70 | 30 |
| Example 8 | G-1 | 95 | 5 |
| Example 9 | G-1 | 65 | 35 |
| Example 10 | G-1 | 55 | 45 |
| Comparative Example 1 | G-4 | 70 | 30 |
| Comparative Example 2 | G-5 | 70 | 30 |
| Comparative Example 3 | G-5 | 100 | 0 |
| Comparative Example 4 | G-1 | 100 | 0 |
| Comparative Example 5 | | 0 | 100 |

TABLE 3

| | Izod impact strength (kgcm/cm) | Resistance to thermal deformation (%) | MFR (g/10 min) | Chemical resistance Methanol | Chemical resistance Gasoline |
|---|---|---|---|---|---|
| Example 1 | 43 | 1.6 | 11.7 | No change | No change |
| Example 2 | 44 | 1.5 | 12.0 | " | " |
| Example 3 | 41 | 1.6 | 12.1 | " | " |
| Example 4 | 50 | 1.4 | 12.5 | " | " |
| Example 5 | 52 | 1.5 | 12.7 | " | " |
| Example 6 | 49 | 1.6 | 11.9 | " | " |
| Example 7 | 42 | 1.4 | 12.2 | " | " |
| Example 8 | 45 | 3.5 | 8.1 | " | " |
| Example 9 | 40 | 1.2 | 18.3 | " | " |
| Example 10 | 32 | 1.0 | 25.5 | " | " |
| Comparative Example 1 | 42 | 7.6 | 11.9 | No change | No change |
| Comparative Example 2 | 16 | 1.5 | 13.2 | " | " |
| Comparative Example 3 | 30 | 28.0 | 2.8 | Whitened | Whitened |
| Comparative Example 4 | 45 | 29.5 | 3.5 | " | " |
| Comparative Example 5 | 3.9 | 0.8 | 37.5 | No change | No change |

EXAMPLES 11 TO 20 AND COMPARITIVE EXAMPLES 6 TO 8

PBT ( N1200, mfd. by Mitsubishi Rayon Co., Ltd., having an intrinsic viscosity of 1.26 measured at 25° C. in a mixed solvent of tetrachloroethane/phenol=1/1 by weight) and Graft Copolymer G-1 to G-9 were mixed in proportions as listed in Table 4. Test samples were injection molded and subjected to evaluation of the properties in the same manner as in Examples 1 to 10. The results are shown in Table 5.

TABLE 4

| | Graft Copolymer Kind | Graft Copolymer Amount (parts) | PBT Amount (parts) |
|---|---|---|---|
| Example 11 | G-1 | 70 | 30 |
| Example 12 | G-2 | 70 | 30 |
| Example 13 | G-3 | 70 | 30 |
| Example 14 | G-6 | 70 | 30 |
| Example 15 | G-7 | 70 | 30 |
| Example 16 | G-8 | 70 | 30 |
| Example 17 | G-9 | 70 | 30 |
| Example 18 | G-1 | 95 | 5 |
| Example 19 | G-1 | 65 | 35 |
| Example 20 | G-1 | 55 | 45 |
| Comparative Example 6 | G-4 | 70 | 30 |
| Comparative Example 7 | G-5 | 70 | 30 |
| Comparative Example 8 | | 0 | 100 |

TABLE 5

| | Izod impact strength (kgcm/cm) | Resistance to thermal deformation (%) | MFR (g/10 min) | Chemical resistance Methanol | Chemical resistance Gasoline |
|---|---|---|---|---|---|
| Example 11 | 51 | 1.5 | 9.7 | No change | No change |
| Example 12 | 51 | 1.5 | 9.8 | " | " |
| Example 13 | 50 | 1.6 | 9.7 | " | " |
| Example 14 | 58 | 1.5 | 9.9 | " | " |
| Example 15 | 60 | 1.4 | 9.8 | " | " |
| Example 16 | 57 | 1.4 | 9.5 | " | " |
| Example 17 | 50 | 1.6 | 9.6 | " | " |
| Example 18 | 45 | 3.4 | 7.5 | " | " |
| Example 19 | 55 | 1.1 | 12.1 | " | " |
| Example 20 | 35 | 0.9 | 18.6 | " | " |
| Comparative Example 6 | 52 | 7.7 | 9.9 | No change | No change |
| Comparative Example 7 | 18 | 1.4 | 9.7 | " | " |
| Comparative Example 8 | 6.1 | 0.8 | 31.2 | " | " |

EXAMPLE 21 TO 30 AND COMPARATIVE EXAMPLES 9 TO 10

Polyethylene terephthalate (hereinafter referred to as "PET", PET-J 135 mfd. by Mitsui PET Resin Co., Ltd.) and Graft Copolymers G-1 to G-9 were mixed in proportions as listed in Table 6, followed by kneading using a biaxial extruder (bent type) of 30 mm in diameter at 260° C. Then, test samples were injection molded using an injection machine at the cylinder temperature of 260° C. and the mold temperature of 70° C. Using the test samples, the properties were evaluated and listed in Table 7.

TABLE 6

| | Graft Copolymer Kind | Graft Copolymer Amount (parts) | PET Amount (parts) |
|---|---|---|---|
| Example 21 | G-1 | 70 | 30 |
| Example 22 | G-2 | 70 | 30 |
| Example 23 | G-3 | 70 | 30 |

TABLE 6-continued

|  | Graft Copolymer | | PET |
|---|---|---|---|
|  | Kind | Amount (parts) | Amount (parts) |
| Example 24 | G-6 | 70 | 30 |
| Example 25 | G-7 | 70 | 30 |
| Example 26 | G-8 | 70 | 30 |
| Example 27 | G-9 | 70 | 30 |
| Example 28 | G-1 | 95 | 5 |
| Example 29 | G-1 | 65 | 35 |
| Example 30 | G-1 | 55 | 45 |
| Comparative Example 9 | G-4 | 70 | 30 |
| Comparative Example 10 | G-5 | 70 | 30 |

TABLE 7

|  | Izod impact strength (kgcm/cm) | Resistance to thermal deformation (%) | MFR (g/10 min) | Chemical resistance | |
|---|---|---|---|---|---|
|  |  |  |  | Methanol | Gasoline |
| Example 21 | 38 | 1.2 | 13.5 | No change | No change |
| Example 22 | 37 | 1.2 | 14.0 | " | " |
| Example 23 | 38 | 1.1 | 14.0 | " | " |
| Example 24 | 42 | 1.1 | 14.2 | " | " |
| Example 25 | 43 | 1.3 | 13.8 | " | " |
| Example 26 | 43 | 1.2 | 13.9 | " | " |
| Example 27 | 37 | 1.2 | 13.6 | " | " |
| Example 28 | 40 | 3.4 | 8.8 | " | " |
| Example 29 | 33 | 0.8 | 22.4 | " | " |
| Example 30 | 25 | 0.6 | 31.1 | " | " |
| Comparative Example 9 | 39 | 7.0 | 13.4 | No change | No change |
| Comparative Example 10 | 10 | 1.2 | 13.5 | " | " |

EXAMPLES 31 TO 35 AND COMPARATIVE EXAMPLES 11 TO 12

Graft Copolymers G-1 to G-7, PBT (1401-X06, mfd. by Toray Industries, Inc.) and dioctyl adipate (hereinafter referred to as "DOA") were mixed in proportions as listed in Table 8., followed by kneading using a biaxial extruder (bent type) of 30 mm in diameter at 250° C. Then, test samples were injection molded using an injection machine at the cylinder temperature of 250° C. and the mold temperature of 50° C. Using the test samples, the properties were evaluated and listed in Table 9.

TABLE 8

|  | Graft Copolymer | | PBT | DOA |
|---|---|---|---|---|
|  | Kind | Amount (parts) | Amount (parts) | Amount (parts) |
| Example 31 | G-1 | 70 | 30 | 5 |
| Example 32 | G-2 | 70 | 30 | 5 |
| Example 33 | G-3 | 70 | 30 | 5 |
| Example 34 | G-6 | 70 | 30 | 5 |
| Example 35 | G-7 | 70 | 30 | 5 |
| Comparative Example 11 | G-4 | 70 | 30 | 5 |
| Comparative Example 12 | G-5 | 70 | 30 | 5 |

TABLE 9

|  | Izod impact strength (kgcm/cm) | Resistance to thermal deformation (%) | MFR (g/10 min) | Chemical resistance | |
|---|---|---|---|---|---|
|  |  |  |  | Methanol | Gasoline |
| Example 31 | 60 | 1.9 | 17.6 | No change | No change |
| Example 32 | 62 | 1.8 | 18.0 | " | " |
| Example 33 | 60 | 1.9 | 18.2 | " | " |
| Example 34 | 69 | 1.7 | 18.9 | " | " |
| Example 35 | 61 | 1.8 | 18.3 | " | " |
| Comparative Example 11 | 58 | 10.1 | 17.9 | No change | No change |
| Comparative Example 12 | 23 | 1.8 | 19.8 | " | " |

EXAMPLES 36 TO 39 AND COMPARATIVE EXAMPLES 13 TO 14

Graft Copolymer G-10, PBT (1401-X06, mfd. by Toray Industries, Inc.) and dioctyl adipate (DOA) were mixed in proportions as listed in Table 10, followed by kneading using a biaxial extruder (bent type) of 30 mm in diameter at 250° C. Then, test samples were injection molded using an injection machine at the cylinder temperature of 250° C. and the mold temperature 50° C. Using the test samples, the properties were evaluated and listed in Table 11.

TABLE 10

|  | Graft Copolymer | | PBT | DOA |
|---|---|---|---|---|
|  | Kind | Amount (parts) | Amount (parts) | Amount (parts) |
| Example 36 | G-10 | 70 | 30 | 5 |
| Example 37 | G-10 | 70 | 30 | 2 |
| Example 38 | G-10 | 95 | 5 | 15 |
| Example 39 | G-10 | 55 | 45 | 5 |
| Comparative Example 13 | G-10 | 70 | 30 | 25 |
| Comparative Example 14 | G-10 | 100 | 0 | 5 |

TABLE 11

|  | Izod impact strength (kgcm/cm) | Resistance to thermal deformation (%) | MFR (g/10 min) | Chemical resistance Methanol | Gasoline |
|---|---|---|---|---|---|
| Example 36 | 30 | 1.7 | 31.6 | No change | No change |
| Example 37 | 24 | 1.6 | 28.5 | " | " |
| Example 38 | 36 | 2.0 | 45.8 | " | " |
| Example 39 | 15 | 1.1 | 51.3 | " | " |
| Comparative Example 13 | 40 | 7.4 | 38.7 | No change | No change |
| Comparative Example 14 | 10 | 31.7 | 22.1 | Whitened | Whitened |

EXAMPLES 40 TO 44 AND COMPARATIVE EXAMPLES 15 TO 16

Graft Copolymers G-1 to G-7, PET (PET-J 135, mfd. by Mitsui PET Resin Co., Ltd.), and DOA were mixed in proportions as listed in Table 12, followed by kneading using a biaxial extruder (bent type) of 30 mm in diameter at 260° C. Then, test samples were injection molded using an injection machine at the cylinder temperature of 260° C. and the mold temperature of 70° C. Using the test samples, the properties were evaluated and listed in Table 13.

TABLE 12

|  | Graft Copolymer Kind | Amount (parts) | PET Amount (parts) | DOA Amount (parts) |
|---|---|---|---|---|
| Example 40 | G-1 | 70 | 30 | 5 |
| Example 41 | G-2 | 70 | 30 | 5 |
| Example 42 | G-3 | 70 | 30 | 5 |
| Example 43 | G-6 | 70 | 30 | 5 |
| Example 44 | G-7 | 70 | 30 | 5 |
| Comparative Example 15 | G-4 | 70 | 30 | 5 |
| Comparative Example 16 | G-5 | 70 | 30 | 5 |

TABLE 13

|  | Izod impact strength (kgcm/cm) | Resistance thermal deformation (%) | MFR (g/10 min) | Chemical resistance Methanol | Gasoline |
|---|---|---|---|---|---|
| Example 40 | 50 | 1.5 | 20.1 | No change | No change |
| Example 41 | 52 | 1.4 | 21.3 | " | " |
| Example 42 | 49 | 1.5 | 21.2 | " | " |
| Example 43 | 60 | 1.4 | 22.0 | " | " |
| Example 44 | 48 | 1.4 | 21.7 | " | " |
| Comparative Example 15 | 50 | 9.7 | 21.7 | No change | No change |
| Comparative Example 16 | 17 | 1.3 | 22.5 | " | " |

EXAMPLES 45 TO 48 AND COMPARATIVE EXAMPLE 17

Graft Copolymer G-10, PET (PET-J 135, mfd. by Mitsui PET Resin Co., Ltd.), and DOA were mixed in proportions as listed in Table 14, followed by kneading using a biaxial extruder (bent type) of 30 mm in diameter at 260° C. Then, test samples were injection molded using an injection machine at the cylinder temperature of 260° C. and the mold temperature of 70° C. Using the test samples, the properties were evaluated and listed in Table 15.

TABLE 14

|  | Graft Copolymer Kind | Amount (parts) | PET Amount (parts) | DOA Amount (parts) |
|---|---|---|---|---|
| Example 45 | G-10 | 70 | 30 | 5 |
| Example 46 | G-10 | 70 | 30 | 2 |
| Example 47 | G-10 | 95 | 5 | 15 |
| Example 48 | G-10 | 55 | 45 | 5 |
| Comparative Example 17 | G-10 | 70 | 30 | 25 |

TABLE 15

|  | Izod impact strength (kgcm/cm) | Resistance thermal deformation (%) | MFR (g/10 min) | Chemical resistance Methanol | Gasoline |
|---|---|---|---|---|---|
| Example 45 | 25 | 1.2 | 35.1 | No change | No change |
| Example 46 | 20 | 1.2 | 33.4 | " | " |
| Example 47 | 34 | 1.8 | 49.2 | " | " |
| Example 48 | 14 | 0.7 | 55.5 | " | " |
| Comparative Example 17 | 36 | 6.4 | 48.7 | No change | No change |

REFERENCE EXAMPLE 6

Production of Graft Copolymer G-11

(1) Emulsion Polymerization in the Presence of Grafted Polymer Rubber Latex

Formulation

| Component (i) | |
|---|---|
| Deionized water | 1425 parts |
| Emulsifier (Nonsoul TN-1) | 10.6 parts |
| Rongalite C | 2.8 parts |
| Component (ii) | |

| -continued | |
|---|---|
| Styrene | 435 parts |
| Acrylonitrile | 165 parts |
| Cumene hydroperoxide | 2.1 parts |
| tert-Dodecylmercaptan | 2.4 parts |

Polymerization Procedure

In a reactor, uniformly dissolved component (i) and component (ii) were placed and mixed uniformly with stirring. Then, the grafted polymer rubber latex obtained in Reference Example 1(a) wa added thereto in an amount of 400 parts (solid content containing residual monomers: 40% based on the total weight of grafted polymer rubber, styrene and acrylonitrile) and mixed with stirring for 30 minutes while bubbling with nitrogen to remove dissolved oxygen. Then, the polymerization was carried out at 65° C. for about 6 hours. After confirmation of the conversion of 90%, the polymerization was continued at 90° C. for further 2 hours to yield a resin latex. The resin latex was salted out in hot water dissolving potassium alum, followed by removing water by means of centrifugation, and dried to give a resin powder (hereinafter referred to as "Graft Copolymer G-11).

REFERENCE EXAMPLE 7

Production of Graft Copolymer G-12,

To a grafted polymer rubber latex obtained in the same manner as described in Reference Example 1(a), 0.33 part of potassium persulfate, 0.8 part of KS Soap and 50 parts of deionized water were added. The polymerization was carried out at 65° C. for 3 hours. The Conversion A was 95%. In a reactor, the grafted polymer rubber latex in an amount of 100 parts in terms of solid content was charged, followed by addition of the following component (1). After bubbling nitrogen to remove dissolved oxygen, the temperature was raised to 73° C. Then, the following component (2) was added dropwise in about 3 hours. After dropwise addition, the polymerization was carried out for further 3 hours. After salting out in hot water dissolving potassium alum, the resin was subjected to removal of water by means of centrifugation and dried to give a resin powder. This is named as Graft Copolymer G-12.

| Component (1) | |
|---|---|
| Sodium sulfite | 0.12 part |
| Potassium carbonate | 1.69 parts |
| Potassium persulfate | 2.43 parts |
| Deionized water | 240 parts |
| Component (2) | |
| Styrene | 112.6 parts |
| Acrylonitrile | 37.5 parts |
| t-Dodecylmercaptan | 0.68 part |
| Emulsifier (Emal 2F) | 0.15 part |
| Emulsifier (KS Soap) | 2.85 parts |
| Deionized water | 40 parts |

REFERENCE EXAMPLE 8

Production of Graft Copolymer G-13

(a) Production of Grafted Polymer Rubber Latex

Formulation

| Component (1) | |
|---|---|
| Polybutadiene latex (the same one as used in Reference Example 1) | 300 parts (solid content) |
| Component (2) | |
| Butyl acrylate | 700 parts |
| Triallyl isocyanurate | 14 parts |
| Component (3) | |
| Potassium persulfate | 0.4 part |
| Sodium sulfite | 0.04 part |
| Emulsifier (Nonsoul TN-1) | 9.2 parts |
| Deionized water | 1420 parts |
| Component (4) | |
| Potassium persulfate | 0.33 part |
| Emulsifier (KS Soap) | 0.8 part |
| Deionized water | 50 parts |

Polymerization Procedure

In a reactor, the component (1) and uniformly dissolved component (3) were charged and mixed with stirring, followed by addition of uniformly dissolved component (2). After bubbling with nitrogen to remove dissolved oxygen, the temperature was raised to 60° to 65° C. After polymerizing for about 4 hours, the component (4) was added thereto, followed by polymerization at 65° C. for further 3 hours. The Conversion A was 96% and substantially completed in the polymerization.

(b) Emulsion Polymerization in the Presence of Grafted Polymer Rubber Latex

| Component (1) | |
|---|---|
| Grafted poly rubber latex obtained above (solid content containing residual monomers) | 507 parts |
| Component (2) | |
| Deionized wate | 778 parts |
| Emulsifier (Emal 2F) | 0.92 part |
| Emulsifier (KS Soap) | 4.33 parts |
| Component (3) | |
| Styrene | 29.8 parts |
| Acrylonitrile | 28.9 parts |
| Cumene hydroperoxide | 0.312 part |
| Component (4) | |
| Styrene | 30.4 parts |
| t-Dodecylmercaptan | 0.285 parts |
| Component (5) | |
| Rongalite C | 3.28 parts |
| Deionized water | 126 parts |
| Component (6) | |
| Potassium carbonate | 8.25 parts |
| Deionized water | 78.0 parts |
| Component (7) | |
| Styrene | 483.6 parts |
| Acrylonitrile | 188 parts |
| t-Dodecylmercaptan | 2.15 parts |
| Cumene hydroperoxide | 1.88 parts |
| Emulsifier (KS Soap) | 12.5 parts |
| Deionized water | 440 parts |
| Component (8) | |
| Emulsifier (KS Soap) | 0.27 part |
| Deionized water | 127 parts |
| Component (9) | |
| Potassium persulfate | 1.49 parts |
| Deionized water | 72 parts |

Polymerization Procedure

In a reactor, the components (1), (2), (3), (4) and (5) were placed in this order and stirred for about 1 hour while bubbling with nitrogen to remove dissolved oxygen. Then, the temperature was raised to 70° C. and the polymerization was carried out for 1 hour. After confirming that Conversion B became 60%, the component (6) was added thereto, followed by dropwise addition of the component (7) in 2 hours, while polymerizing at 74° C. After dropwise addition of the component (7), the component (8) was added thereto After 1 hour, the component (9) was added thereto and polymerized for further 2 hours. The resulting resin latex was salted out in hot water dissolving (or a hot aqueous solution of) potassium alum, subjected to removal of water by means of centrifugations and dried to give a resin powder of Graft copolymer G-13.

EXAMPLES 49 TO 50 AND COMPARATIVE EXAMPLES 18 to 21

Resin powders of Graft Copolymers G-11 to G-13 obtained above, acrylonitrile-styrene copolymer resin (Stylac 703, mfd. by Asahi Kasei Kogyo K.K., hereinafter referred to as "AS-1"), and PBT (1401-X06, mfd. by Toray Industries, Inc.) were mixed in proportions as listed in Table 16. The resulting mixture was kneaded using a biaxial extruder of 30 mm in diameter at 250° C. Test samples were injection molded at the cylinder temperature of 250° C. and the mold temperature of 50° C. The properties of the test samples were evaluated and listed in Table 17.

TABLE 16

| | Graft Copolymer | | Rigid resin | | Polyester | |
|---|---|---|---|---|---|---|
| | Kind | Amount (parts) | Kind | Amount (parts) | Kind | Amount (parts) |
| Example 49 | G-11 | 50 | AS-1 | 20 | PBT | 30 |
| Example 50 | G-13 | 50 | AS-1 | 20 | PBT | 30 |
| Comparative Example 18 | G-12 | 50 | AS-1 | 20 | PBT | 30 |
| Comparative Example 19 | G-12 | 71.5 | AS-1 | 28.5 | | 0 |
| Comparative Example 20 | G-11 | 71.5 | A-1 | 28.5 | | 0 |
| Comparative Example 21 | G-13 | 71.5 | AS-1 | 28.5 | | 0 |

TABLE 17

| | Izod impact strength (kgcm/cm) | Resistance to thermal deformation (%) | MFR (g/10 min) | Chemical resistance | |
|---|---|---|---|---|---|
| | | | | Methanol | Gasoline |
| Example 49 | 23 | 1.7 | 20.0 | No change | No change |
| Example 50 | 21 | 1.4 | 18.0 | " | " |
| Comparative Example 18 | 11 | 1.6 | 17.6 | No change | No change |
| Comparative Example 19 | 28 | 27.0 | 13.0 | Whitened | Whitened |
| Comparative Example 20 | 33 | 27.5 | 12.5 | " | " |
| Comparative Example 21 | 32 | 26.0 | 12.8 | " | " |

EXAMPLES 51–56 AND COMPARATIVE EXAMPLES 22–25

Graft Copolymer G-1 or G-5, PBT (1401-X06) and a plasticizer were mixed in amounts as shown in Table 18 and kneaded using a biaxial extruder (bent type) of 30 mm in diameter at 250° C. Then, test samples were injection molded using an injection machine at the cylinder temperature of 250° C. and the mold temperature of 50° C. Using the test samples, the properties were evaluated and listed in Table 19.

In Table 19, DIDP means diisodecyl phthalate, TOP means trioctyl phosphate, ESO means epoxidized soybean oil, and TIDT means triisodecyl trimellitate, these compounds being used as a plasticizer.

TABLE 18

| | Graft Copolymer | | PBT | DIDP | TOP | ESO | TIDT |
|---|---|---|---|---|---|---|---|
| | Kind | Amount (parts) | Amount (parts) | Amount (parts) | Amount (parts) | Amount (parts) | Amount (parts) |
| Example 51 | G-1 | 70 | 30 | 5 | 0 | 0 | 0 |
| Example 52 | G-1 | 70 | 30 | 0 | 5 | 0 | 0 |
| Example 53 | G-1 | 70 | 30 | 0 | 0 | 5 | 0 |
| Example 54 | G-1 | 70 | 30 | 0 | 0 | 0 | 5 |
| Example 55 | G-1 | 70 | 30 | 2 | 0 | 0 | 0 |
| Example 56 | G-1 | 70 | 30 | 15 | 0 | 0 | 0 |
| Comparative Example 22 | G-5 | 70 | 30 | 5 | 0 | 0 | 0 |
| Comparative Example 23 | G-5 | 70 | 30 | 0 | 5 | 0 | 0 |
| Comparative Example 24 | G-5 | 70 | 30 | 0 | 0 | 5 | 0 |
| Comparative Example 25 | G-5 | 70 | 30 | 0 | 0 | 0 | 5 |

TABLE 19

| | Izod impact strength (kgcm/cm) | Resistance to thermal deformation (%) | MFR (g/10 min) | Chemical resistance | |
|---|---|---|---|---|---|
| | | | | Methanol | Gasoline |
| Example 51 | 59 | 1.8 | 17.8 | No change | No change |

TABLE 19-continued

|  | Izod impact strength (kgcm/cm) | Resistance to thermal deformation (%) | MFR (g/10 min) | Chemical resistance | |
|---|---|---|---|---|---|
|  |  |  |  | Methanol | Gasoline |
| Example 52 | 57 | 1.8 | 17.9 | " | " |
| Example 53 | 60 | 1.9 | 17.9 | " | " |
| Example 54 | 62 | 1.9 | 18.0 | " | " |
| Example 55 | 55 | 1.6 | 14.0 | " | " |
| Example 56 | 70 | 2.0 | 22.5 | " | " |
| Comparative Example 22 | 22 | 1.8 | 19.9 | No change | No change |
| Comparative Example 23 | 20 | 1.8 | 18.7 | " | " |
| Comparative Example 24 | 21 | 1.9 | 19.0 | " | " |
| Comparative Example 25 | 23 | 1.9 | 19.2 | " | " |

EXAMPLES 57-62 AND COMPARATIVE EXAMPLES 26-29

The processes of Examples 51-56 and Comparative Examples 22-25 were repeated except for using PET (PET-J in place of PBT (1401-X06).

The formulations are shown in Table 20 and evaluated properties are shown in Table 21, respectively.

As mentioned above, the thermoplastic resin composition of the present invention can provide molded articles excellent in impact resistance, chemical resistance and resistance to thermal deformation.

TABLE 20

|  | Graft Copolymer | | PET | DIDP | TOP | ESO | TIDT |
|---|---|---|---|---|---|---|---|
|  | Kind | Amount (parts) | Amount (parts) | Amount (parts) | Amount (parts) | Amount (parts) | Amount (parts) |
| Example 57 | G-1 | 70 | 30 | 5 | 0 | 0 | 0 |
| Example 58 | G-1 | 70 | 30 | 0 | 5 | 0 | 0 |
| Example 59 | G-1 | 70 | 30 | 0 | 0 | 5 | 0 |
| Example 60 | G-1 | 70 | 30 | 2 | 0 | 0 | 5 |
| Example 61 | G-1 | 70 | 30 | 2 | 0 | 0 | 0 |
| Example 62 | G-1 | 70 | 30 | 15 | 0 | 0 | 0 |
| Comparative Example 26 | G-5 | 70 | 30 | 5 | 0 | 0 | 0 |
| Comparative Example 27 | G-5 | 70 | 30 | 0 | 5 | 0 | 0 |
| Comparative Example 28 | G-5 | 70 | 30 | 0 | 0 | 5 | 0 |
| Comparative Example 29 | G-5 | 70 | 30 | 0 | 0 | 0 | 5 |

TABLE 21

|  | Izod impact strength (kgcm/cm) | Resistance to thermal deformation (%) | MFR (g/10 min) | Chemical resistance | |
|---|---|---|---|---|---|
|  |  |  |  | Methanol | Gasoline |
| Example 57 | 50 | 1.5 | 21.0 | No change | No change |
| Example 58 | 49 | 1.5 | 20.5 | " | " |
| Example 59 | 49 | 1.4 | 20.7 | " | " |
| Example 60 | 51 | 1.4 | 20.8 | " | " |
| Example 61 | 45 | 1.3 | 17.9 | " | " |
| Example 62 | 62 | 1.9 | 25.2 | " | " |
| Comparative Example 26 | 16 | 1.4 | 21.2 | No change | No change |
| Comparative Example 27 | 15 | 1.4 | 21.4 | " | " |
| Comparative Example 28 | 17 | 1.5 | 21.7 | " | " |
| Comparative Example 29 | 17 | 1.4 | 21.3 | " | " |

What is claimed is:
1. A thermoplastic resin composition comprising
(A) 45 to 99% by weight of a graft copolymer, and
(B) 55 to 1% by weight of a thermoplastic aromatic polyester resin,
said graft copolymer (A) being obtained by polymerizing a polymerizable monomer (b) in an amount of 95 to 50 parts by weight in the presence of a grafted polymer rubber (a) in an amount of 5 to 50 parts by weight, a total of (a) and (b) being 100 parts by weight,
said grafted polymer rubber (a) having been obtained by emulsion polymerization of 95 to 60 parts by weight of a polymerizable monomer mixture ($\alpha$) comprising

(I) 0.1 to 20% by weight of a polyfunctional monomer, (II) 50 to 99.9% by weight of an acrylic ester with an alkyl group having 1 to 13 carbon atoms, and (III) 0 to 30% by weight of a vinyl compound other than (I) and (II), a total of (I) to (III) being 100% by weight, in the presence of 5 to 40 parts by weight of a conjugated diene polymer ($\beta$), a total of ($\alpha$) and ($\beta$) being 100 parts by weight, said polymerizable monomer (b) comprising (IV) 0 to 100% by weight of an aromatic vinyl compound, (V) 0 to 100% by weight of a methacrylic acid ester, and (VI) 0 to 40% by weight of a vinyl cyanide compound, a total of (IV) to (VI) being 100% by weight, said graft copolymer (A) being obtained by (i) polymerizing 5 to 30% by weight of said polymerizable monomer (b) in the presence of said grafted polymer rubber, followed by polymerization of the rest of the polymerizable monomer (b), and/or (ii) emulsion polymerizing said polymerizable monomer mixture ($\alpha$) in the presence of said conjugated diene polymer ($\beta$) until conversion of 50% to 93% by weight, followed by polymerization of said polymerizable monomer (b) in the presence of the resulting grafted polymer rubber (a).

2. A thermoplastic resin composition according to claim 1, wherein the polyfunctional monomer (I) is triallyl isocyanurate or triallyl cyanurate.

3. A thermoplastic resin composition according to claim 1, which further comprises (C) a polymer obtained by polymerizing at least one monomer selected from the group consisting of aromatic vinyl compounds, vinyl cyanide compounds, methacrylic esters and N-substituted maleimide compounds.

4. A thermoplastic resin composition according to claim 1, which further comprises (D) a plasticizer.

5. A shaped article obtained by molding the thermoplastic resin composition of claim 1.

* * * * *